United States Patent [19]

Okayama

[11] Patent Number: 4,744,038

[45] Date of Patent: May 10, 1988

[54] FIRE DETECTOR EQUIPPED WITH A SENSOR

[75] Inventor: Yoshiaki Okayama, Tokyo, Japan

[73] Assignee: Nohmi Bosai Kogyo Co. Ltd., Tokyo, Japan

[21] Appl. No.: 666,071

[22] Filed: Oct. 29, 1984

[30] Foreign Application Priority Data

Nov. 1, 1983 [JP] Japan ................................ 58-203658

[51] Int. Cl.⁴ ......................... G08B 17/10; G01K 7/00

[52] U.S. Cl. ..................................... 364/557; 340/577; 340/628; 374/104

[58] Field of Search ............... 340/540, 541, 632, 600, 340/577, 578, 579, 628, 629, 630, 627, 511, 825.15, 825.26, 525; 364/508, 418, 557; 235/128; 374/104

[56] References Cited

U.S. PATENT DOCUMENTS

| | | | |
|---|---|---|---|
| 3,466,605 | 9/1969 | Schoenwitz | 340/825.15 |
| 3,987,423 | 10/1976 | Roe | 364/418 |
| 4,184,205 | 1/1980 | Morrow | 364/508 |
| 4,254,414 | 3/1981 | Street et al. | 340/627 |
| 4,372,692 | 2/1983 | Thomae | 364/557 X |
| 4,581,605 | 4/1986 | Vogt | 340/525 |

*Primary Examiner*—Felix D. Gruber
*Attorney, Agent, or Firm*—Werner W. Kleeman

[57] ABSTRACT

A fire detector is equipped with a sensor which detects physical quantities such as heat, light or smoke and which, in particular, stores the time when the fire detector responds or generates an alarm and also stores the output level of the sensor at such time and displays these stored data whenever required. It also stores successive output levels of the sensor at each of a series of predetermined time intervals along with the respective time values until the fire detector generates an alarm and displays these stored data whenever required.

5 Claims, 4 Drawing Sheets

FIRE DETECTOR EQUIPPED WITH A SENSOR

CROSS-REFERENCE TO A RELATED APPLICATION

This application is related to the commonly assigned, copending U.S. patent application Ser. No. 06/612,351, filed May 21, 1984 and entitled "Fire Detector Equipped with a Sensor", now abandoned.

BACKGROUND OF THE INVENTION

The present invention broadly relates to fire detectors and, more specifically, pertains to a new and improved construction of a fire detector equipped with a sensor for detecting a physical quantity or parameter such as heat, light or smoke and which, in particular, is capable of storing output levels reached by the sensor at the time of response of the fire detector and also prior to response of the fire detector is capable of storing output levels reached at each of a succession of predetermined time intervals together with the respective time values until the fire detector responds, and of displaying such stored data whenever necessity arises later.

Generally speaking, the fire detector of the present invention stores the time when a fire detector responds or generates an alarm and also stores the output level of the sensor at that time so that these stored data may be displayed later whenever required.

In other words, the fire detector of the present invention comprises a sensor for detecting a physical quantity such as heat, light or smoke and the sensor has a signal output level which changes in response to changes in such physical quantity. The fire detector constantly monitors changes in the signal output level of the sensor and responds or generates an alarm when the signal output level exceeds a prescribed reference or set level. The fire detector further comprises first storage means for storing a value of the time at which the fire detector responds or generates an alarm and for storing a value of an output level of the sensor at such time.

Conventional fire detectors of this kind continuously monitor changes in the output level of a sensor and respond or generate an alarm when a predetermined reference or set level is exceeded. Therefore, even though the response of the fire detector indicates that the output level of the sensor has exceeded the predetermined reference or set level, the actual output level and the time at which the fire detector responded and, moreover, changes or variations in the output level before the fire detector responded, cannot be determined later. Therefore, it has heretofore been impossible to accurately determine the cause of false alarms produced by such fire detectors.

SUMMARY OF THE INVENTION

Therefore, with the foregoing in mind, it is a primary object of the present invention to provide a new and improved construction of a fire detector which does not have associated with it the aforementioned drawbacks and shortcomings of the prior art constructions.

Another and more specific object of the present invention aims at providing a new and improved construction of a fire detector of the previously mentioned type which is equipped with means for storing the time when the fire detector responds or generates an alarm and also for storing the output level of the sensor at that time, means for storing a succession of output levels reached by the sensor at predetermined time intervals together with the respective time values, and which further contains means for displaying the stored times and output levels at any time so that these stored data may be confirmed or analyzed later whenever necessary.

Yet another significant object of the present invention aims at providing a new and improved construction of a fire detector of the character described which is relatively simple in construction and design, extremely economical to manufacture, highly reliable in operation, not readily subject to breakdown and malfunction and requires a minimum of maintenance and servicing.

Now in order to implement these and still further objects of the invention, which will become more readily apparent as the description proceeds, the fire detector of the present invention is manifested by the features that it is equipped with storage means for storing the output level of the sensor together with the time at which the fire detector responds or generates an alarm, storage means for storing successive output levels of the sensor in temporal sequence at prescribed intervals until the fire detector responds, and display means for displaying at any random later time such stored output level and time data.

Thus, it is possible to confirm or obtain information concerning the output level of the sensor and the time at which the fire detector responds or generates an alarm as well as changes or variations in the output level before response of the fire detector whenever necessity arises later.

BRIEF DESCRIPTION OF THE DRAWINGS

The invention will be better understood and objects other than those set forth above, will become apparent when consideration is given to the following detailed description thereof. Such description makes reference to the annexed drawings wherein.

Figure 1:
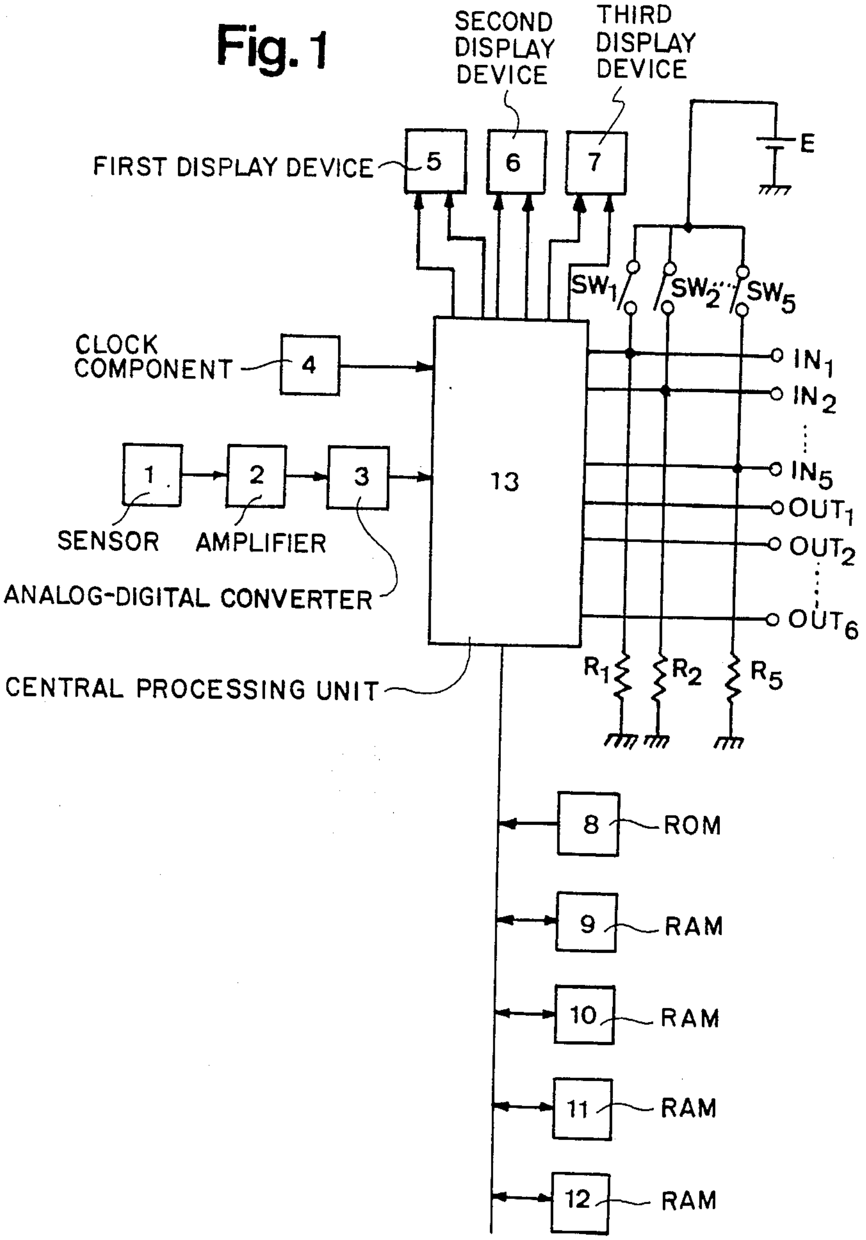
FIG. 1 is a block diagram of a preferred embodiment of the invention.
Figure 2A:
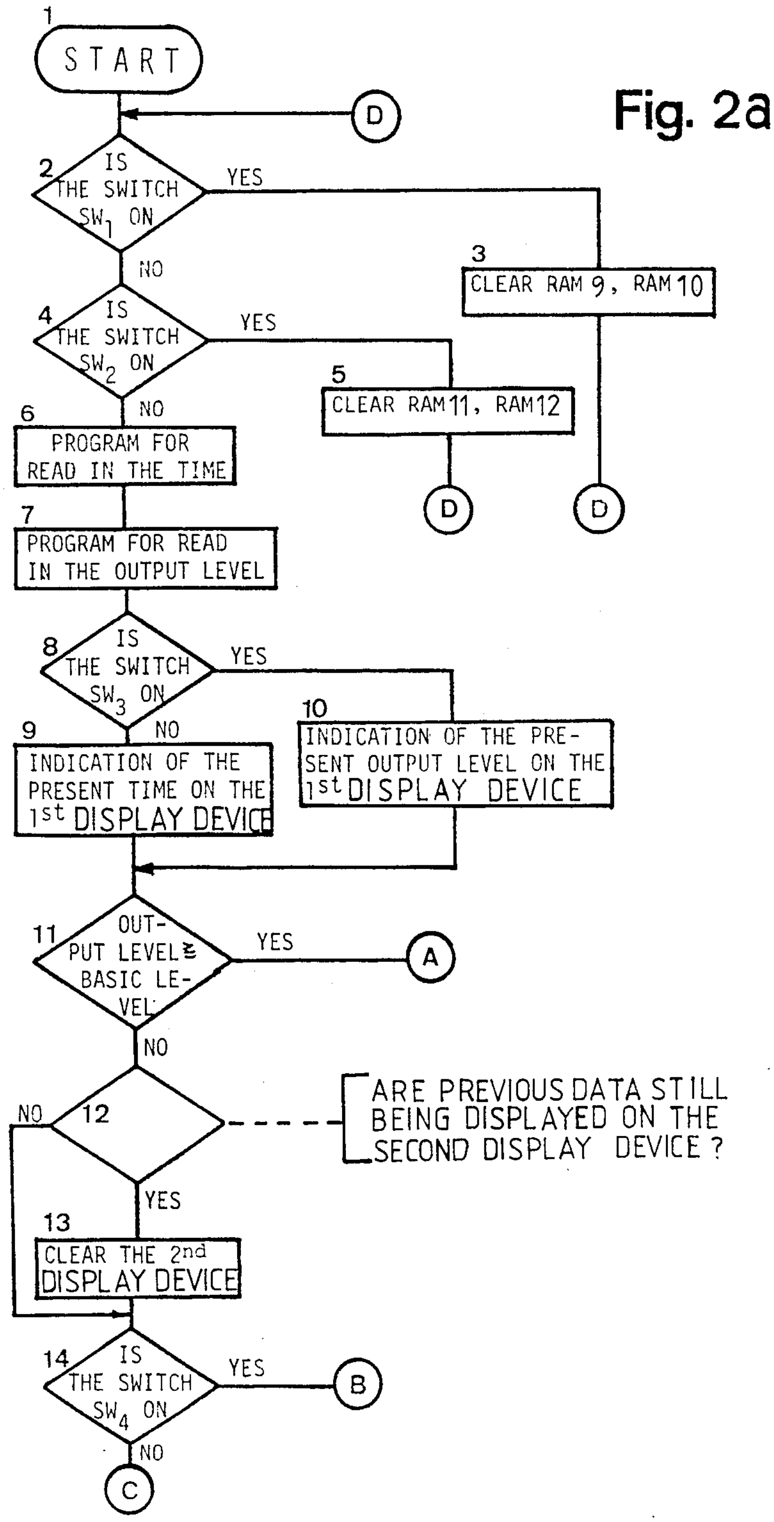
Figure 2B:
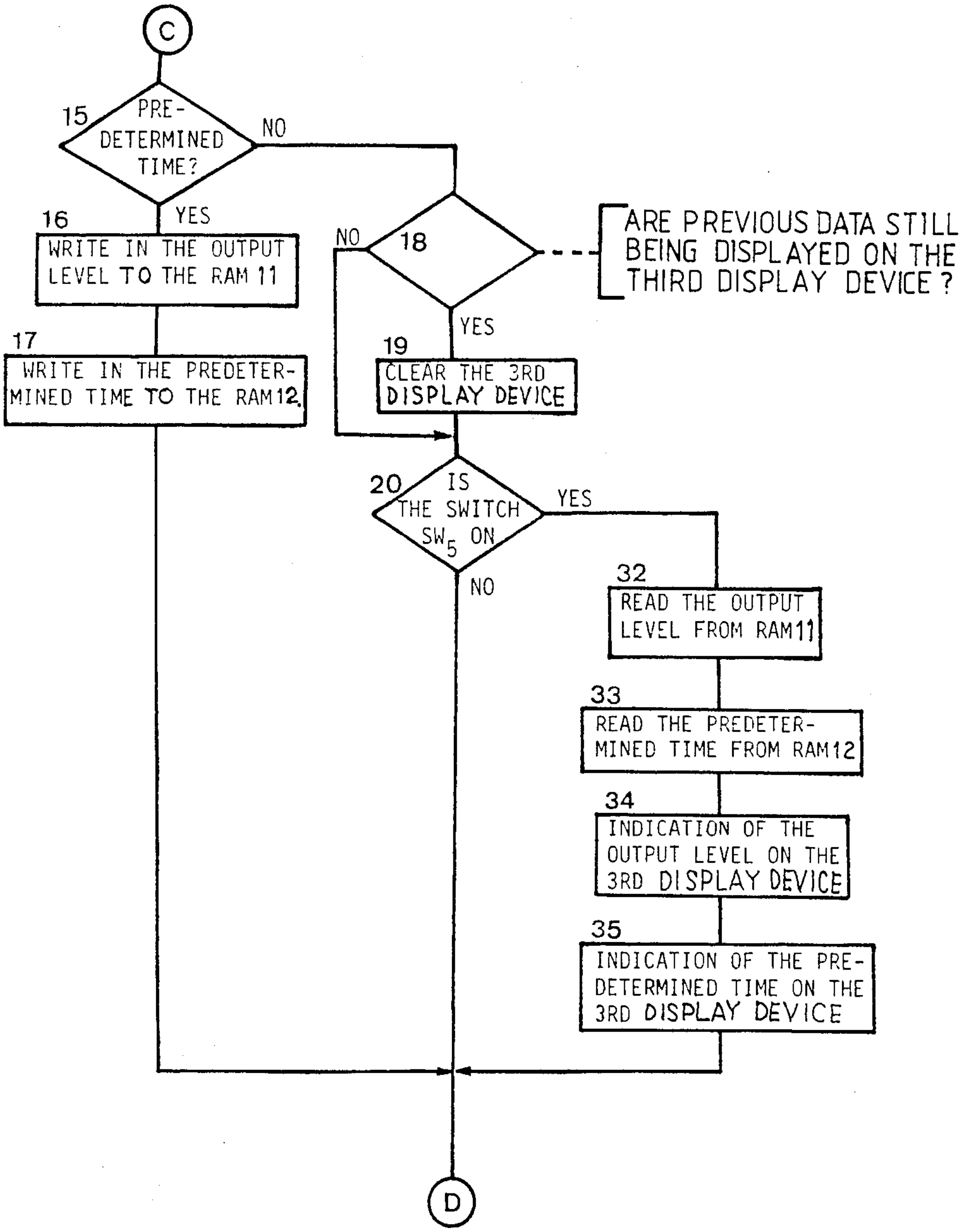
Figure 2C:
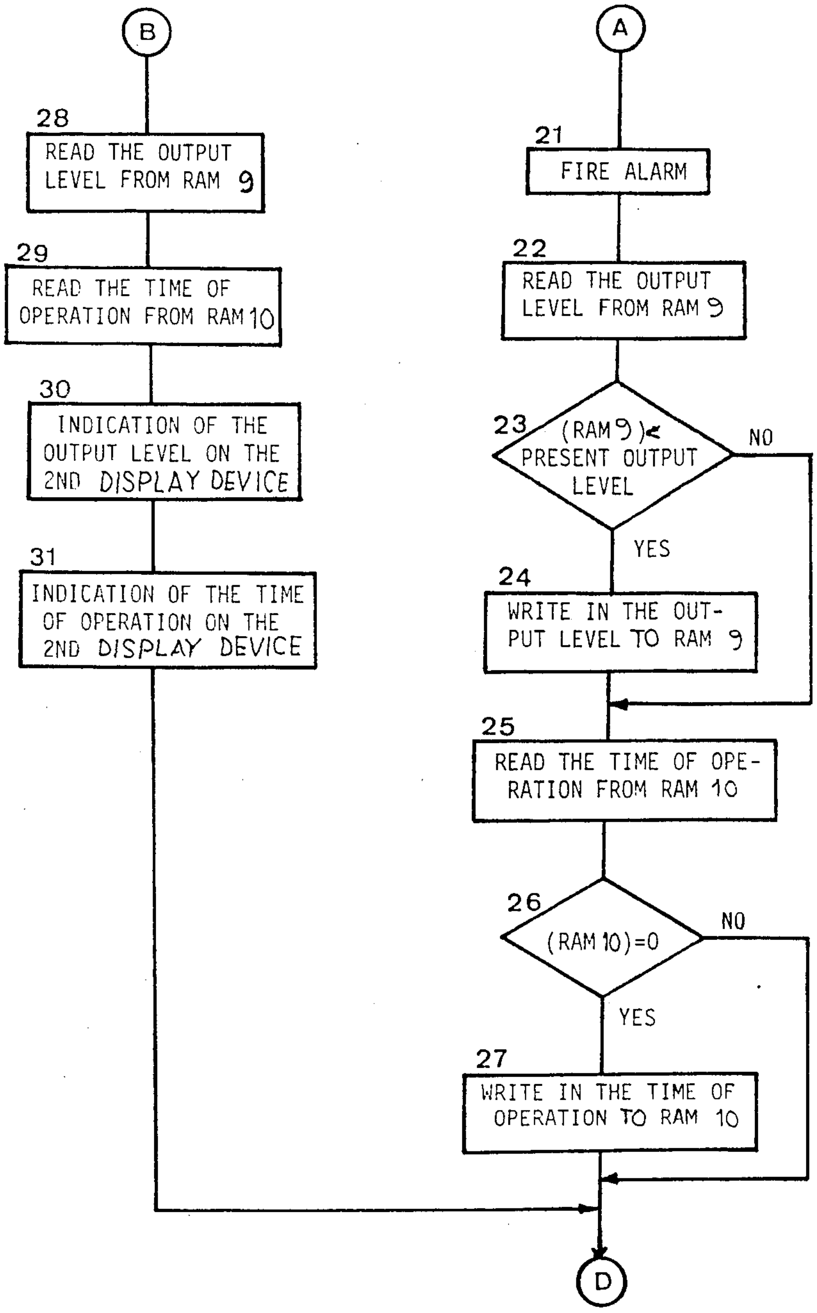

FIGS. *2a*, *2b* and *2c* depict a flow chart illustrating programmed operation of the CPU 13 of the arrangement of FIG. 1.

DETAILED DESCRIPTION OF THE PREFERRED EMBODIMENTS

Describing now the drawings, it is to be understood that to simplify the showing of the drawings only enough of the structure of the fire detector has been illustrated therein as is needed to enable one skilled in the art to readily understand the underlying principles and concepts of this invention. Turning now specifically to FIG. 1 of the drawings, the apparatus illustrated therein by way of example and not limitation will be seen to comprise a suitable sensor 1 for detecting a physical quantity or parameter such as heat, light or smoke. An amplifier 2 connected to the output side of the sensor 1 amplifies the output signal of the sensor 1. An A-D or analog-digital converter 3 connected to the output side of the amplifier 2 converts an analog signal representing an output level of the sensor 1 to a digital signal which is then delivered to a central processing unit (CPU) 13. A clock component or circuit 4 is also connected to the CPU 13.

A first display device 5 for displaying a present or current time or, if desired, a present or current output level of the sensor 1 is also connected to this CPU 13. A second display device 6 for displaying the output level of the sensor 1 reached at the time at which the fire detector responds and stored in a RAM 9 as well as the time of such response stored in a RAM 10 is also connected to the CPU 13. A third display device 7 for displaying the output of the sensor 1 reached at each of a succession of predetermined times before response of the fire detector and stored in the RAM 11 as well as the corresponding times stored in the RAM 12 is also connected to the CPU 13.

A first memory or storage register 8 (hereinafter referred to as the ROM 8) for storing a predetermined set or reference level as a basis for determining whether or not the output level of the sensor 1 should be considered to represent a fire is also connected to the CPU 13. A second memory or storage register 9 (hereinafter referred to as the RAM 9) for storing the output level of the sensor 1 at the time at which the fire detector responds is also connected to the CPU 13. A third memory or storage register 10 (hereinafter referred to as the RAM 10) for storing the time of such response is also connected to the CPU 13.

A fourth memory or storage register 11 (hereinafter referred to as the RAM 11) for storing successive output levels in temporal sequence at prescribed time intervals until the fire detector responds is also connected to the CPU 13. A fifth memory or storage register 12 (hereinafter referred to as the RAM 12) for storing such predetermined times in sequence is also connected to the CPU 13.

These components 1 through 12 are connected to the central processing unit 13 (hereinafter referred to as the CPU 13) for their centralized control. Further connected to the CPU 13 are interface or operating and control means comprising a power supply E, switches $SW_1$–$SW_5$ and resistors $R_1$–$R_5$, input terminals $IN_1$–$IN_5$ to which peripheral devices or external apparatus corresponding or equivalent to the individual switches $SW_1$–$SW_5$ may be connected and output terminals $OUT_1$–$OUT_6$ to which peripheral devices or external apparatus corresponding or equivalent to the display devices 5, 6 and 7 may be connected.

The switch $SW_1$, resistor $R_1$ and input terminal $IN_1$ are provided for clearing the RAM 9 and the RAM 10 by operating such switch $SW_1$or equivalent external apparatus connected to the input terminal $IN_1$. The switch $SW_2$, resistor $R_2$ and input terminal $IN_2$ are provided for clearing the RAM 11 and the RAM 12 by operating such switch $SW_2$ or equivalent external apparatus connected to the input terminal $IN_2$.

The switch $SW_3$, resistor $R_3$ and input terminal $IN_3$ are provided for switching the display of the first display device 5 from the present or current time to the present or current output level of the sensor 1 by operating such switch $SW_3$ or equivalent external apparatus connected to the input terminal $IN_3$. The switch $SW_4$, resistor $R_4$ and input terminal $IN_4$ are for switching the second display device 6 to display either the output level of the sensor 1 at which the fire detector responds or the corresponding time.

The switch $SW_5$, resistor $R_5$ and input terminal $IN_5$ are for switching the third display device 7 to display the output levels of the sensor 1 reached at each of a succession of predetermined times together with the respective times until the fire detector responds. The output terminals $OUT_1$–$OUT_6$ are for transmitting the respective time and output level signals to external apparatus or peripheral devices corresponding or equivalent to the display devices 5, 6 and 7.

Operation of the illustrated exemplary embodiment will be described below in relation to the flow chart for the CPU 13 shown in FIGS. *2a* to *2c*. The output of the sensor 1 is continuously amplified by the amplifier 2 and the analog signal representing the output level is converted to a digital signal by the A-D converter 3, which is then sent to the CPU 13. A signal from the clock component or circuit 4 representing the present or current time is also sent to the CPU 13. The ROM 8 stores the reference level for comparison with the current or momentary output level of the sensor 1.

As the CPU 13 starts operating (step 1), the RAM 9 and the RAM 10 possibly containing previous data are cleared (step 3) if the switch $SW_1$ for clearing the RAM 9 and the RAM 10 is set in the ON position. If the switch $SW_1$ is set in the OFF position (step 2), it is assumed that there is no need of clearing the RAM 9 and the RAM 10.

Then a discrimination is made as to whether the switch $SW_2$ for clearing the RAM 11 and RAM 12 is set in the ON or OFF position (step 4). As in the foregoing, the RAM 11 and RAM 12 are cleared if the switch $SW_2$ is set in the ON position (step 5). If the switch $SW_2$ is set in the OFF position, it is assumed that there is no need of clearing the RAM 11 and RAM 12 and, by employing the signals from the clock component or circuit 4 and the A-D converter 3, the present or current time and the output level of the sensor 1 are read in (steps 6 and 7 respectively).

Then a discrimination is made as to whether the switch $SW_3$ for switching the display of the first display device 5 from the present or current time to the present or current output level is set in the ON position (step 8). Since the switch $SW_3$ is normally set in the OFF position, the present or current time will normally be displayed on the first display device 5 (step 9).

The output level of the sensor 1 read-in in the above step 7 is compared with the reference or set level stored in the ROM 8 (step 11). However, since the output level of the sensor 1 does not reach the reference level until a fire breaks out, a further discrimination is made as to whether the second display device 6 is still displaying previous data (data valid at the time of the previous response) (step 12). If so, the second display device 6 is cleared (step 13). If no data are being displayed, the operation proceeds to the next step.

In either case, a discrimination is made as to whether the switch SW4 for switching the second display device 6 to display the output level of the sensor 1 at which the fire detector responds and the corresponding time is set in the ON position (step 14). Since the switch $SW_4$ is normally set in the OFF position, a further discrimination is made as to whether the predetermined time for storing the output level and the time of response in the RAM 11 and the RAM 12, respectively, has arrived (step 15).

If the predetermined time has arrived, the current output level of the sensor 1 and the current time are written into and stored in the RAM 11 and the RAM 12, respectively (steps 16 and 17), and operation reverts to step 2 and the above steps are reiterated. If the predetermined time has not arrived at step 15, a discrimination is made as to whether the previous data (data valid at the time of the previous response) are still being displayed on the third display device 7 (step 18). If so, the third display device 7 is cleared (step 19). If no data are being displayed, operation proceeds to the next step.

In either case, a discrimination is made as to whether the switch $SW_5$ for switching the third display device 7 to display the output levels of the sensor 1 at each of the succession of predetermined times until the fire detector responds and the respective times is set in the ON position (step 20). Since this switch $SW_5$, too, is normally set in the OFF position, operation normally reverts back to step 2 and reiterates the above steps.

At steps 16 and 17 the output level of the sensor 1 reached at each of the succession of predetermined times and the respective time are stored sequentially in the RAM 11 and the RAM 12, respectively. The RAM 11 and RAM 12 have multiple addresses or storage registers. At each predetermined time the output level and then the corresponding time value are written into and stored in the first address or storage register, and those data which were previously stored in the first address or storage register, second address or storage register and so on are transferred to subsequent addresses or storage registers and the oldest data stored in the last address or storage register are cleared or cancelled, i.e. are shifted out and lost.

If the current output level of the sensor 1 exceeds the reference level (step 11), the fire detector responds by generating a fire alarm (step 21) which is transmitted to a suitable control panel or central signal station not particularly shown in the drawings. The above output level at this time as well as the corresponding time of response are written into and stored in the RAM 9 and the RAM 10, respectively (steps 24 and 27) and operation reverts to step 2 and reiterates the above steps.

In the early stages of steps 24 and 27, the output level previously stored in the RAM 9 is read (step 22) and compared with the present or current output level (step 23). The RAM 10 is read (step 25) to discriminate whether the time of response has already been stored in the RAM 10. Since nothing will have been initially stored in the RAM 9 and the RAM 10, the output level at this time and the current time are written into and stored in the RAM 9 and the RAM 10, respectively.

Once they are stored, the present or current output level is compared with the output level stored in the RAM 9 at step 23 whenever operation from step 2 onward is reiterated during the alarm state. If the current output level is less than the stored output level, operation proceeds to the next step. If the present or current output level is greater, it replaces the stored output level in the RAM 9 and is retained. Therefore, the RAM 9 stores the maximum value of the output level reached during the alarm state. On the other hand, the RAM 10 stores the time at which the fire detector first responded and this time remains as it was originally stored.

By setting the switch $SW_3$ in the ON position (step 8), the display on the first display device 5 can be changed from present or current time to the present or current output level (step 10), whereby changes in the output level of the sensor 1 can be checked at any time. If it is later desired to know the output level of the sensor 1 and the time at which the fire detector responded, the switch $SW_4$ is set in the ON position (step 14). Then the stored output level of the sensor 1 and the time of response are read in from the RAM 9 and RAM 10, respectively (steps 28 and 29), and displayed on the second display device 6 (steps 30 and 31). If it is desired to know the output level of the sensor 1 at each of the succession of predetermined times until the fire detector responded and the respective times, the switch $SW_5$ is set in the ON position (step 20). Then the stored output level at each predetermined time and the respective time value are read in from the RAM 11 and RAM 12, respectively (steps 32 and 33), and displayed on the third display device 7 (steps 34 and 35).

While the above description concerns the operating procedure using the switches $SW_1$–$SW_5$, it is also possible to cause the above operation to be performed remotely by operating peripheral devices or external apparatus which constitute operating or input means and which are connected to the input terminals $IN_1$–$IN_5$. Furthermore, external apparatus which constitute or are equivalent to display means may be connected to the output terminals $OUT_1$–$OUT_6$ for displaying the various above-mentioned data on these display means in parallel with or instead of displaying such data on the above-described display devices 5, 6 and 7. Although the first display device 5 is designed to constantly display the present or current time only and, whenever required, to alternately display a present or current output level only in response to operation of the switch $SW_3$, other display methods may also be adopted, e.g. simultaneous indication of both the time and the output level, the choice of which should be properly made.

As can be seen from the above description the fire detector according to this invention is equipped with a sensor which detects a physical quantity or parameter such as heat, light or smoke and with storage means for storing the output level of the sensor together with time when the fire detector responds. It is also equipped with storage means for storing output levels of the sensor in temporal sequence at appropriately prescribed intervals until the fire detector responds and the respective time values as well as display means for displaying at any time those stored output levels and time values. Thus, it is possible to confirm or obtain information concerning the output level of the sensor and the time at which the fire detector responded and changes or variations in the output level before response of the fire detector whenever necessity arises later. This feature is particularly helpful for determining the cause of false alarms. As described above, this invention provides a fire detector having advantages that have never been realized in conventional detectors.

While there are shown and described present preferred embodiments of the invention, it is to be distinctly understood that the invention is not limited thereto, but may be otherwise variously embodied and practiced within the scope of the following claims. ACCORDINGLY,

What I claim is:

1. A fire detector, comprising:

a sensor for detecting a physical quantity such as heat, light or smoke;

said sensor having a signal output level which changes in response to changes in said physical quantity;

processing means constantly monitoring changes in said signal output level and generating an alarm when said signal output level exceeds a prescribed reference level;

first storage means for storing a value of a time at which the processor means generates an alarm and for storing a value of said signal output level of said sensor at such time;

second storage means for storing successive signal output levels of said sensor and the associated moments of time of the occurrence of such signal output levels during prescribed time intervals which precede the point in time until the alarm is generated; and display means for selectively displaying said stored times and said stored signal output levels.

2. The fire detector as defined in claim 1, wherein:

said first storage means stores said value of a time at which the processor means generates an alarm conjointly with a maximum value of said signal output level attained during an alarm state.

3. The fire detector as defined in claim 1, wherein:

said second storage means comprises multiple storage registers;

said second storage means storing a new current value of said signal output level of said sensor at each said prescribed time interval in a first storage register of said multiple storage registers;

previously stored values of said signal output level being sequentially transferred from said first storage register and successive ones of said multiple storage registers to respective subsequent ones thereof in order to free said first storage register for said new current value of said signal output level; and an oldest previously stored value of said signal output level stored in a last storage register of said multiple storage registers being shifted out of said last storage register and lost.

4. The fire detector as defined in claim 1, further including:

control means connected to said processing means;

said control means and said processing means operatively interconnecting said display means and said first storage means and said second storage means;

said display means containing display means associated with said first storage means for selectively displaying said stored times and said stored signal output level stored in said first storage means; and said display means further containing display means associated with said second storage means for displaying said successive signal output levels and the respective times stored in said second storage means.

5. A fire detector, comprising:

a sensor for detecting a physical quanitity such as heat, light or smoke;

said sensor having a signal output level which changes in response to changes in said physical quantity;

processing means constantly monitoring changes in said signal output level and generating an alarm when said signal output level exceeds a predeterminate reference level;

first storage means for storing a time at which the processor means generates an alarm and selectively at least any one of (i) a value of said signal output level of said sensor at such time or (ii) a maximum value of said signal output level attained during an alarm state;

second storage means for storing successive signal output levels of said sensor and the associated moments of time of the occurrence of such signal output levels during prescribed time intervals until the alarm is generated; and display means for selectively displaying said stored times and said stored signal output levels.

* * * * *